(12) United States Patent
Singal et al.

(10) Patent No.: US 11,323,291 B2
(45) Date of Patent: May 3, 2022

(54) PORT ACTIVATION SYSTEM

(71) Applicant: Dell Products L.P., Round Rock, TX (US)

(72) Inventors: Pawan Kumar Singal, Milpitas, CA (US); Balaji Rajagopalan, Sunnyvale, CA (US); Joseph LaSalle White, San Jose, CA (US); Archana Potnuru, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 33 days.

(21) Appl. No.: 16/946,910

(22) Filed: Jul. 10, 2020

(65) Prior Publication Data
US 2022/0014393 A1    Jan. 13, 2022

(51) Int. Cl.
*H04W 72/04*     (2009.01)
*H04L 12/46*     (2006.01)
*H04L 41/12*     (2022.01)

(52) U.S. Cl.
CPC ...... *H04L 12/4633* (2013.01); *H04L 12/4641* (2013.01); *H04L 41/12* (2013.01); *H04W 72/042* (2013.01)

(58) Field of Classification Search
CPC . H04L 12/4633; H04L 12/4641; H04L 41/12; H04L 1/1614; H04W 72/042; H04W 72/1273; H04W 76/11
See application file for complete search history.

(56) References Cited

U.S. PATENT DOCUMENTS

| | | | |
|---|---|---|---|
| 2006/0203715 A1 | 9/2006 | Hunter et al. | |
| 2013/0294318 A1* | 11/2013 | Amerga | H04W 4/06 370/312 |
| 2014/0006585 A1 | 1/2014 | Dunbar et al. | |
| 2020/0196383 A1* | 6/2020 | Tsai | H04W 80/02 |
| 2021/0218455 A1* | 7/2021 | Park | H04B 7/0626 |

* cited by examiner

*Primary Examiner* — Wei Zhao
(74) *Attorney, Agent, or Firm* — Joseph Mencher

(57) ABSTRACT

A server-facing port activation system includes a core network system, a server device, and a networking device that includes at least one uplink port coupled to the core network system, and a first downlink port coupled to the server device. The networking device begin initialization operations and, in response, identifies that the first downlink port is coupled to the server device and prevents the first downlink port from being made available. While preventing the first downlink port from being made available, the networking device configures the at least one uplink port coupled to the core network system with server device information associated with the server device. The networking device then determines that the at least one uplink port coupled to the core network system is available and, in response, causes the first downlink port that is coupled to the server device to be made available.

20 Claims, 12 Drawing Sheets

PORT ACTIVATION SYSTEM

BACKGROUND

The present disclosure relates generally to information handling systems, and more particularly to activating ports on an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, are often connected to server devices in order to allow the server devices to communicate data via a network connected to the switch device. For example, the switch device may include a plurality of switch uplink ports that are connected to a core network system that provides access to the network, along with a plurality of switch downlink ports that may be connected to server devices via their server uplink ports, as well as to a variety of other devices known in the art. Following a reset, reboot, and/or other initialization of the switch device, switch downlink ports connected to respective server devices may become available (e.g., those switch downlink ports may be "brought up" by an operating system in the switch device) prior to the switch uplink ports that are connected to the core network system becoming available. For example, the switch uplink ports may only become available once the switch device and/or the switch uplink ports have been configured with Virtual Local Area Network (VLAN) information associated with VLANs that the server devices are configured to use to communicate, while the switch downlink ports may become available prior to that configuration having been completed. The availability of the switch downlink ports prior to the availability of the switch uplink ports can result in the server devices connected to the switch downlink ports identifying that switch downlink port availability and, in response, transmitting data traffic via their server uplink ports to those switch downlink ports. As will be appreciated by one of skill in the art in possession of the present disclosure, the transmission of data traffic to the switch downlink ports prior to the availability of the switch uplink ports can result in the switch device "dropping" or otherwise discarding that data traffic, as the switch uplink ports are not available to transmit it to the network via the core network system.

Accordingly, it would be desirable to provide a port activation system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a server-facing port activation engine that is configured to begin initialization operations and, in response: identify that a first downlink port is coupled to a server device; prevent the first downlink port that is coupled to the server device from being made available; configure, while preventing the first downlink port that is coupled to the server device from being made available, at least one uplink port that is coupled to a core network system with server device information associated with the server device; determine that the at least one uplink port that is coupled to the core network system is available; and cause, in response to determining that the at least one uplink port that is coupled to the core network system is available, the first downlink port that is coupled to the server device to be made available.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
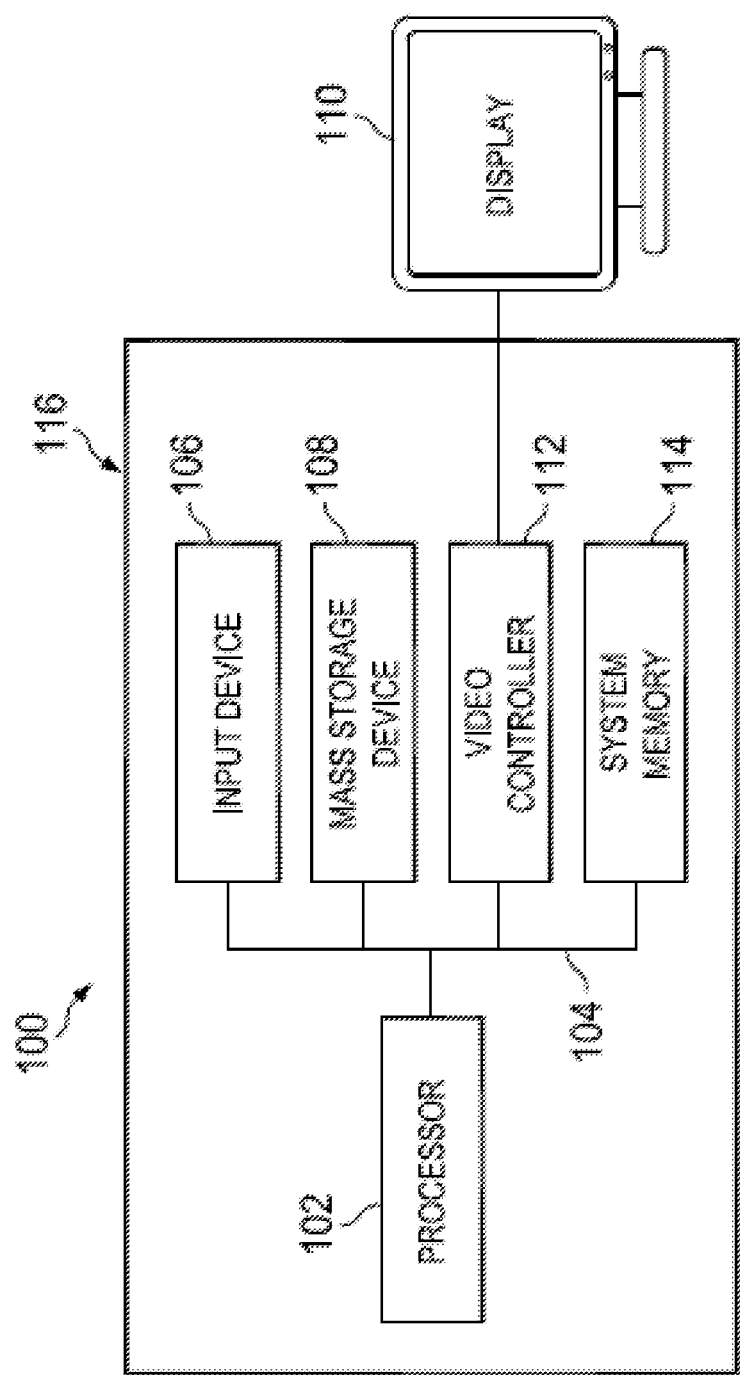
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
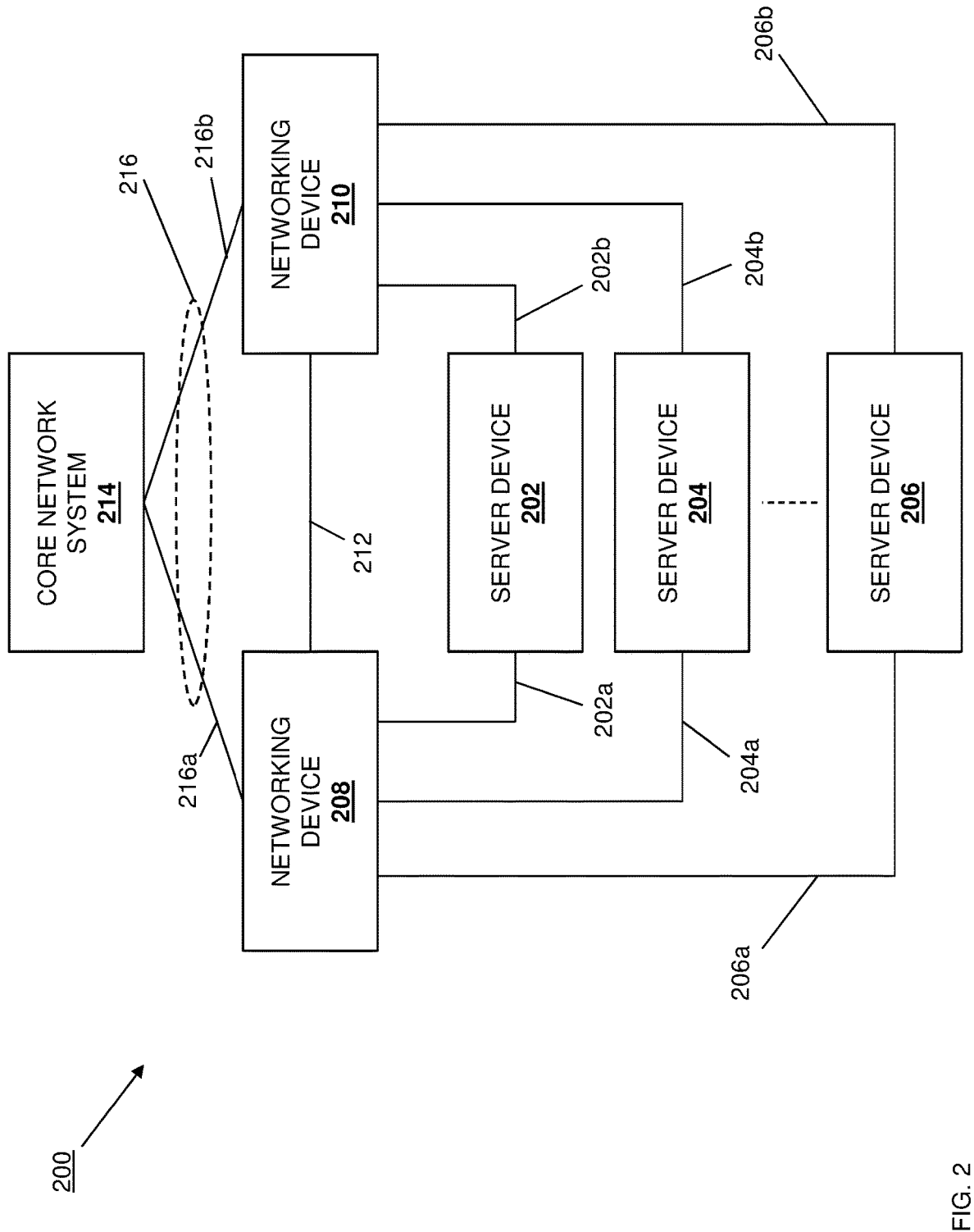
FIG. 2 is a schematic view illustrating an embodiment of a server-facing port activation system.

Referring now to FIG. 2, an embodiment of the port activation system of the present disclosure is illustrated that provides a server-facing port activation system 200. In the illustrated embodiment, the server-facing port activation system 200 includes a plurality of server devices 202, 204, and up to 206. In an embodiment, any or all of the server devices 202-206 may be provided by the IHS 100 discussed above with reference to FIG. 1, and/or may include some or all of the components of the IHS 100, and in specific examples may include server devices housed in a common server rack. However, while illustrated and discussed as being provided by server devices housed in the same server rack, one of skill in the art in possession of the present disclosure will recognize that server devices provided in the server-facing port activation system 200 may be replaced by any devices that may be configured to operate similarly as the server devices 202-206 discussed below by, for example, transmitting data communications via a network, and/or with those devices located in a variety of configurations (e.g., within different racks) while remaining within the scope of the present disclosure as well.

In the illustrated embodiment, the server-facing port activation system 200 also includes a pair of networking devices 208 and 210. In an embodiment, either or both of the networking devices 208 and 210 may be provided by the IHS 100 discussed above with reference to FIG. 1, and/or may include some or all of the components of the IHS 100, and in specific examples may be provided by a pair of redundant leaf switch devices that are each configured as Top Of Rack (TOR) switch devices and included in the same server rack as the server devices 202-206. However, while illustrated and discussed as being provided by redundant TOR switch devices housed in the same server rack as the server devices 202-206 to which they are connected, one of skill in the art in possession of the present disclosure will recognize that networking devices provided in the server-facing port activation system 200 may be replaced by any devices that may be configured to operate similarly as the networking devices discussed below, and/or with those devices located in a variety of configurations (e.g., within different racks as each other and/or the server devices to which they are coupled) while remaining within the scope of the present disclosure as well.

Each of the server devices 202-206 may be coupled to each of the networking devices 208 and 210, with FIG. 2 illustrating the server device 202 coupled to the networking device 208 by a link 202a and coupled to the networking device 208 by a link 202b, the server device 204 coupled to the networking device 208 by a link 204a and coupled to the networking device 208 by a link 204b, and the server device 206 coupled to the networking device 208 by a link 206a and coupled to the networking device 208 by a link 206b. As discussed below, links between server devices and networking devices in the server-facing port activation system 200 may be provided by cabling between ports on those server devices and networking devices, and each of the links 202a, 202b, 204a, 204b, 206a, and 206b illustrated in FIG. 2 may be provided by one or more of those cabled connections (e.g., any of those links may be an aggregated link provided by multiple cabled connections.) Furthermore, as illustrated, the networking devices 208 and 210 may be coupled together by a link 212, and as discussed below that link 212 may be provided by cabling between ports on the networking devices, and may be provided by one or more of those cabled connections (e.g., the link 212 may be an aggregated link provided by multiple cabled connections.) In a specific example, the networking devices 208 and 210 may operate according to the Virtual Link Trunking (VLT) protocol available in networking devices provided by DELL® Inc. of Round Rock, Tex., United States, and the link 212 may be provided by an Inter-Chassis Link (ICL) such as, for example, a VLT interconnect (VLTi) provided according to the VLT protocol.

In the illustrated embodiment, the server-facing port activation system 200 also includes a core networking system 214. In an embodiment, the core networking system 214 may include one or more core networking devices, any or all of which may be provided by the IHS 100 discussed above with reference to FIG. 1, and/or may include some or all of the components of the IHS 100. As will be appreciated by one of skill in the art in possession of the present disclosure, the core networking system 214 may include any core networking devices that are configured to provide access (via the networking devices 208) to a network such as, for example, a Local Area Network (LAN), the Internet, combinations thereof, and/or other networks known in the art. However, while illustrated and discussed as including a core network system 214, one of skill in the art in possession of the present disclosure will recognize that the port activation system of the present disclosure may be provided without the core networking system 214, and/or with other device that operate similarly to the core networking system 214 discussed below, while remaining within the scope of the present disclosure as well.

Each of the networking devices 208 and 210 is coupled to the core networking system 214, with FIG. 2 illustrating the networking devices 208 and 210 coupled to the core networking system by an aggregated link 216 that includes a link 216a between the networking device 208 and the core networking system 214, and a link 216b between the networking device 210 and the core networking system 214. As discussed below, links between networking devices and the core networking system in the server-facing port activation system 200 may be provided by cabling between ports on those networking devices and the core networking system, and each of the links 216a and 216b illustrated in FIG. 2 may be provided by one or more of those cabled connections (e.g., any of those links may be an aggregated link provided by multiple cabled connections.) In a specific example, the aggregated link 216 may be provided by a Link Aggregation Group (LAG) such as, for example, a VLT port channel provided according to the VLT protocol. However, while a specific server-facing port activation system 200 has been illustrated and described, one of skill in the art in possession of the present disclosure will recognize that the port activation system of the present disclosure may include a variety of components and component configurations while remaining within the scope of the present disclosure as well.

Figure 3:
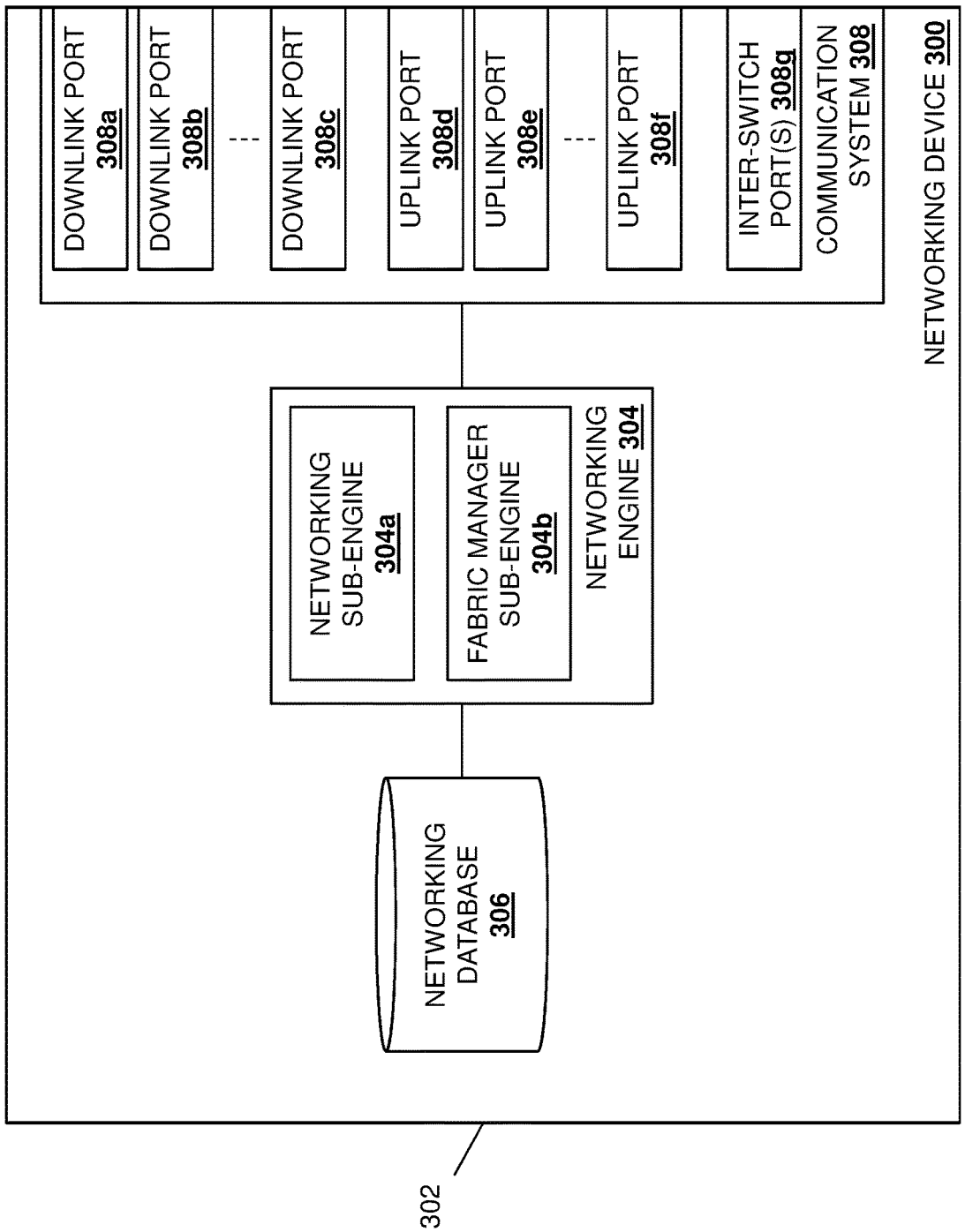
FIG. 3 is a schematic view illustrating an embodiment of a networking device that may be provided in the server-facing port activation system of FIG. 2.

Referring now to FIG. 3, an embodiment of a networking device 300 is illustrated that may provide either or both of the networking devices 208 and 210 discussed above with reference to FIG. 2. As such, the networking device 300 may be provided by the IHS 100 discussed above with reference to FIG. 1 and/or may include some or all of the components of the IHS 100, and in specific examples may be provided by a leaf switch device that is configured as TOR switch device and included in the same server rack as the server devices to which it is coupled. However, while illustrated and discussed as a leaf switch device that is configured as TOR switch device and included in the same server rack as the server devices to which it is coupled, one of skill in the art in possession of the present disclosure will recognize that networking devices provided in the port activation system may be replaced by any devices that may be configured to operate similarly as the networking device 300 discussed below. In the illustrated embodiment, the networking device 300 includes a chassis 302 that houses the components of the networking device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a networking engine 304 that is configured to perform the functionality of the networking engines and/or networking devices discussed below.

In the embodiment illustrated in FIG. 3, the networking engine 304 includes a networking sub-engine 304a that is configured to perform networking device operations, as well as a fabric manager sub-engine 304b that is configured to perform fabric management operations. For example, in some embodiments, the networking engine 304 may may be provided by an operating system (e.g., the next generation Operating System 10 (OS10) provided by DELL® Inc. of Round Rock, Tex., United States), and that operating system may be configured to perform a variety of networking operations, along with providing a fabric manager (e.g., a Smart Fabric Services (SFS) fabric manager available in the next generation OS10 provided by DELL® Inc. of Round Rock, Tex., United States) that is configured to perform a variety of fabric management operations. However, while illustrated and discussed as being provided by a particular operating system including a fabric manager, one of skill in the art in possession of the present disclosure will recognize that the networking device 300 may include a variety of networking engines that may be configured to operate similarly as the networking engine 304 discussed below The chassis 302 may also house a storage system (not illustrated, but which may include the storage 108 discussed above with reference to FIG. 1) that is coupled to the networking engine 304 (e.g., via a coupling between the storage system and the processing system) and that includes a networking database 306 that is configured to store any of the information utilized by the networking engine 304 discussed below. The chassis 302 may also house a communication system 308 that is coupled to the networking engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure.

In the illustrated embodiment, the communication system 308 includes a plurality of downlink ports 308a, 308b, and up to 308c, each of which is configured to couple the networking engine 304 to any of the server devices 202-206 and non-server devices as discussed below. The communication system 308 also includes a plurality of uplink ports 308d, 308e, and up to 308f, each of which is configured to couple the networking engine 304 to the core networking system 214 as discussed below. The communication system 308 also includes one or more inter-switch port(s) 308, any or all of which is configured to couple the networking engine 304 to the other networking devices as discussed below. However, while a specific networking device 300 has been illustrated, one of skill in the art in possession of the present disclosure will recognize that networking devices (or other devices operating according to the teachings of the present disclosure in a manner similar to that described below for the networking device 300) may include a variety of components and/or component configurations for providing conventional networking device functionality, as well as the functionality discussed below, while remaining within the scope of the present disclosure as well.

Figure 4:
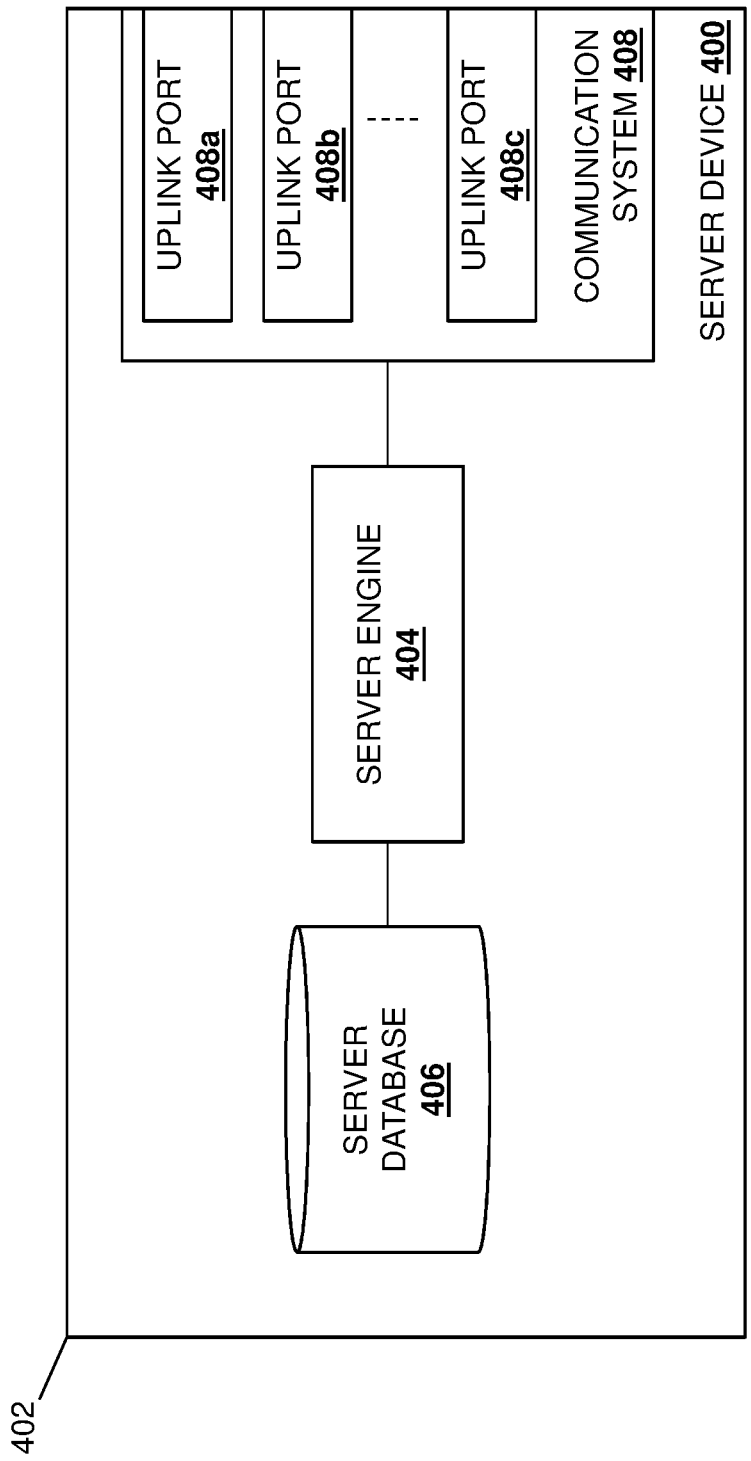
FIG. 4 is a schematic view illustrating an embodiment of a server device that may be provided in the server-facing port activation system of FIG. 2.

Referring now to FIG. 4, an embodiment of a server device 400 is illustrated that may provide any or all of the server devices 202-206 discussed above with reference to FIG. 2. As such, the server device 400 may be provided by the IHS 100 discussed above with reference to FIG. 1 and/or may include some or all of the components of the IHS 100, and in specific examples may be provided by a server device that is included in the same server rack as the networking devices to which it is coupled. Furthermore, while illustrated and discussed as a server device that is included in the same server rack as the networking devices to which it is coupled, one of skill in the art in possession of the present disclosure will recognize that server devices provided in the port activation system of the present disclosure may be replaced by any devices that may be configured to operate similarly as the server device 400 discussed below. In the illustrated embodiment, the server device 400 includes a chassis 402 that houses the components of the server device 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a server engine 404 that is configured to perform the functionality of the server engines and/or server devices discussed below.

The chassis 402 may also house a storage system (not illustrated, but which may include the storage 108 discussed above with reference to FIG. 1) that is coupled to the server engine 404 (e.g., via a coupling between the storage system and the processing system) and that includes a server database 406 that is configured to store any of the information utilized by the server engine 404 discussed below. The chassis 402 may also house a communication system 408 that is coupled to the server engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. In the illustrated embodiment, the communication system 408 includes a plurality of uplink ports 408a, 408b, and up to 408c, each of which is configured to couple the server engine 404 to the networking devices 208 and 210 as discussed below. However, while a specific server device 400 has been illustrated, one of skill in the art in possession of the present disclosure will recognize that server devices (or other devices operating according to the teachings of the present disclosure in a manner similar to that described below for the server device 400) may include a variety of components and/or component configurations for providing conventional server device functionality, as well as the functionality discussed below, while remaining within the scope of the present disclosure as well.

Figure 5:
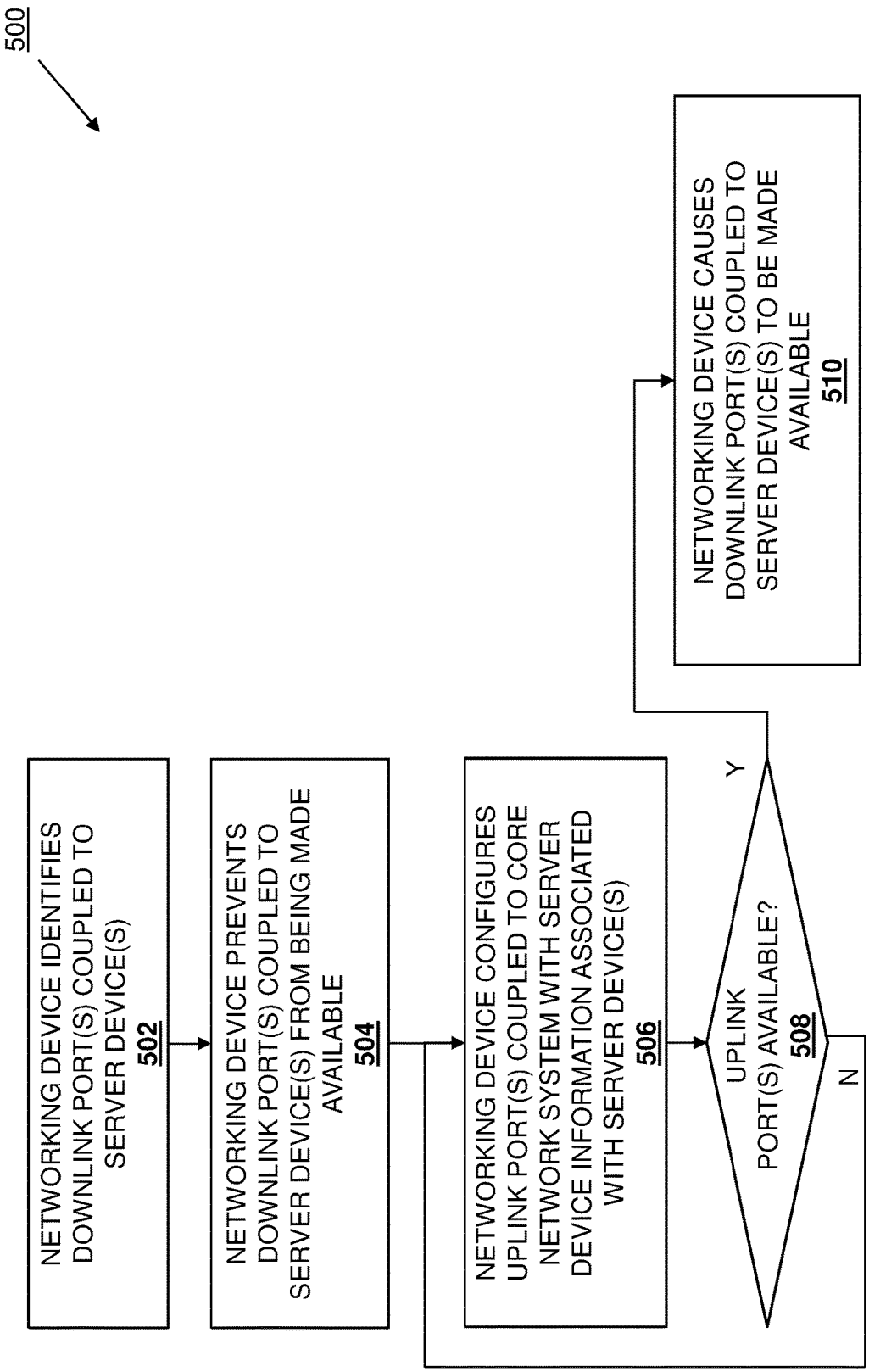
FIG. 5 is a flow chart illustrating an embodiment of a method for activating server-facing ports.

Referring now to FIG. 5, an embodiment of a method 500 for activating server-facing ports is illustrated. As discussed below, the systems and methods of the present disclosure operate to make server-facing downlink ports on a networking device unavailable until uplink ports on the networking device that are connected to a core network are available for use. For example, the networking device includes uplink port(s) that are coupled to the core network, and downlink port(s) that are coupled to server device(s), and in response to beginning initialization operations, the networking device identifies the downlink port(s) coupled to the server device and prevents those downlink port(s) from being made available. While preventing the downlink port(s) coupled to the server device(s) from being made available, the networking device configures the uplink port(s) coupled to the core network system with server device information associated with the server device(s). When the networking device determines that the uplink port(s) coupled to the core network system are available, it causes the downlink port(s) coupled to the server device(s) to be made available. As such, downlink port(s) are not made available for use by the server device(s) until the uplink port(s) are available, thus preventing the networking device from "dropping" or otherwise discarding data traffic that would otherwise be generated and transmitted by the server device(s) if the downlink port(s) were made available prior to the availability of the uplink port(s), as occurs in conventional server-facing port activation systems.

Figure 6A:
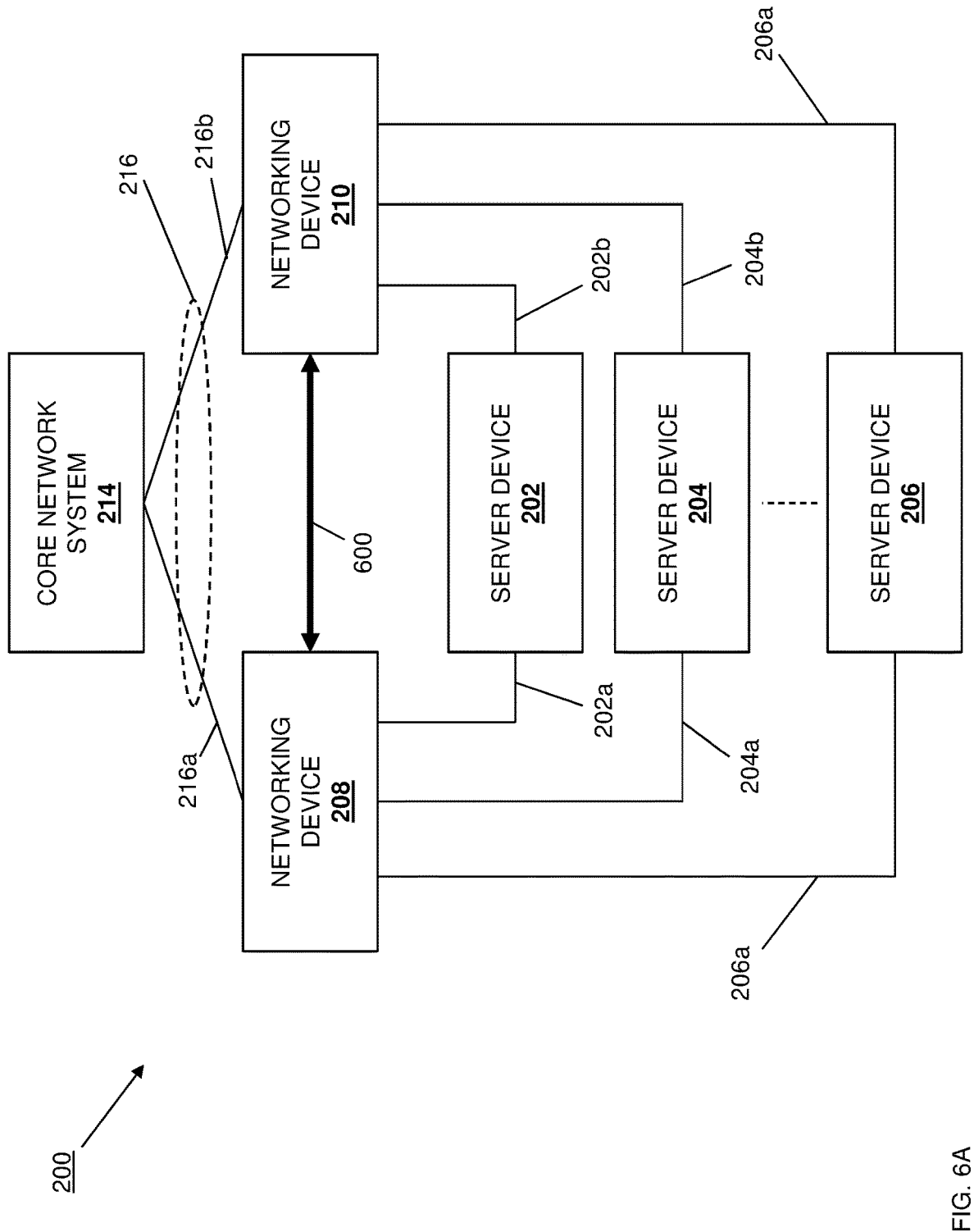
FIG. 6A is a schematic view illustrating an embodiment of the server-facing port activation system of FIG. 2 operating during the method of FIG. 5.

In some embodiments, during or prior to the method 500, the fabric manager sub-engines 304b in the networking devices 208/300 and 210/300 may operate to elect one of those fabric manager sub-engines as a master fabric manager (e.g., a master SFS fabric manager), thus designating the other fabric manager sub-engine as a backup fabric manager (e.g., a backup SFS fabric manager). For example, FIG. 6A illustrates how the fabric manager sub-engines 304b in the networking devices 208/300 and 210/300 may perform inter-networking device operations 600 (e.g., via the link 212) that may include the master/backup fabric manager election operations discussed above. As such, some of the examples below describe the fabric management functionality as being performed by each of the fabric manager sub-engines 304b in the networking devices 208/300 and 210/300 (e.g., for their downlink ports 308a-308c connected to server devices), while other examples below describe how the fabric manager functionality may be performed by the fabric manager sub-engine 304b in the networking device 208/300 that has been elected as the master fabric manager. Furthermore, situations in which the master fabric manager performs the fabric management functionality for both networking devices 208 and 210, one of skill in the art in possession of the present disclosure will recognize that the fabric management functionality may be performed by the fabric manager sub-engine 304b in the networking device 210/300 in response to, for example, the fabric manager sub-engine 304b in the networking device 210/300 being elected as the master fabric manager, the fabric manager sub-engine 304b in the networking device 208/300 becoming unavailable such that the fabric manager sub-engine 304b in the networking device 210/300 operating as the backup fabric manager takes over as the master fabric manager, and/or in other situations that will fall within the scope of the present disclosure as well.

The method 500 begins at block 502 where a networking device identifies downlink ports coupled to server device(s). In some embodiments, at or prior to the method 500, the networking database 306 may be populated with information that associates downlink ports 308a-308c on the networking devices 300 with server devices (e.g., the server devices 202-206) connected to those downlink ports 308a-308c. In one example, a network administrator or other user of the server-facing port activation system 200 may provide downlink port/server device association information that identifies server devices (e.g., the server devices 202-206) that are connected to at least some of the downlink ports 308a-308c on the networking devices 208/300 and 210/300, and that downlink port/server device association information may be stored in the networking database 306. As such, in the examples provided below, the network administrator or other user of the server-facing port activation system 200 may provide downlink port/server device association information that identifies the server device 206a is connected to the downlink port 308a on each of the networking devices 208/300 and 210/300, and that the server device 206b is connected to the downlink port 308c on each of the networking devices 208/300 and 210/300, and that information may be stored in the networking database(s) 306 in each networking device 208 and 210 (e.g., when each networking device 208 and 210 stores information about which server devices are connected to its downlink ports) or in the networking device that includes the fabric manager sub-engine 308*b* that has been elected as the master fabric manager. However, while a specific example is provided, one of skill in the art in possession of the present disclosure will appreciate that server devices may be connected to downlink ports on a networking device in a variety of manners that may be identified by a network administrator or other user while remaining within the scope of the present disclosure as well.

Figure 6B:
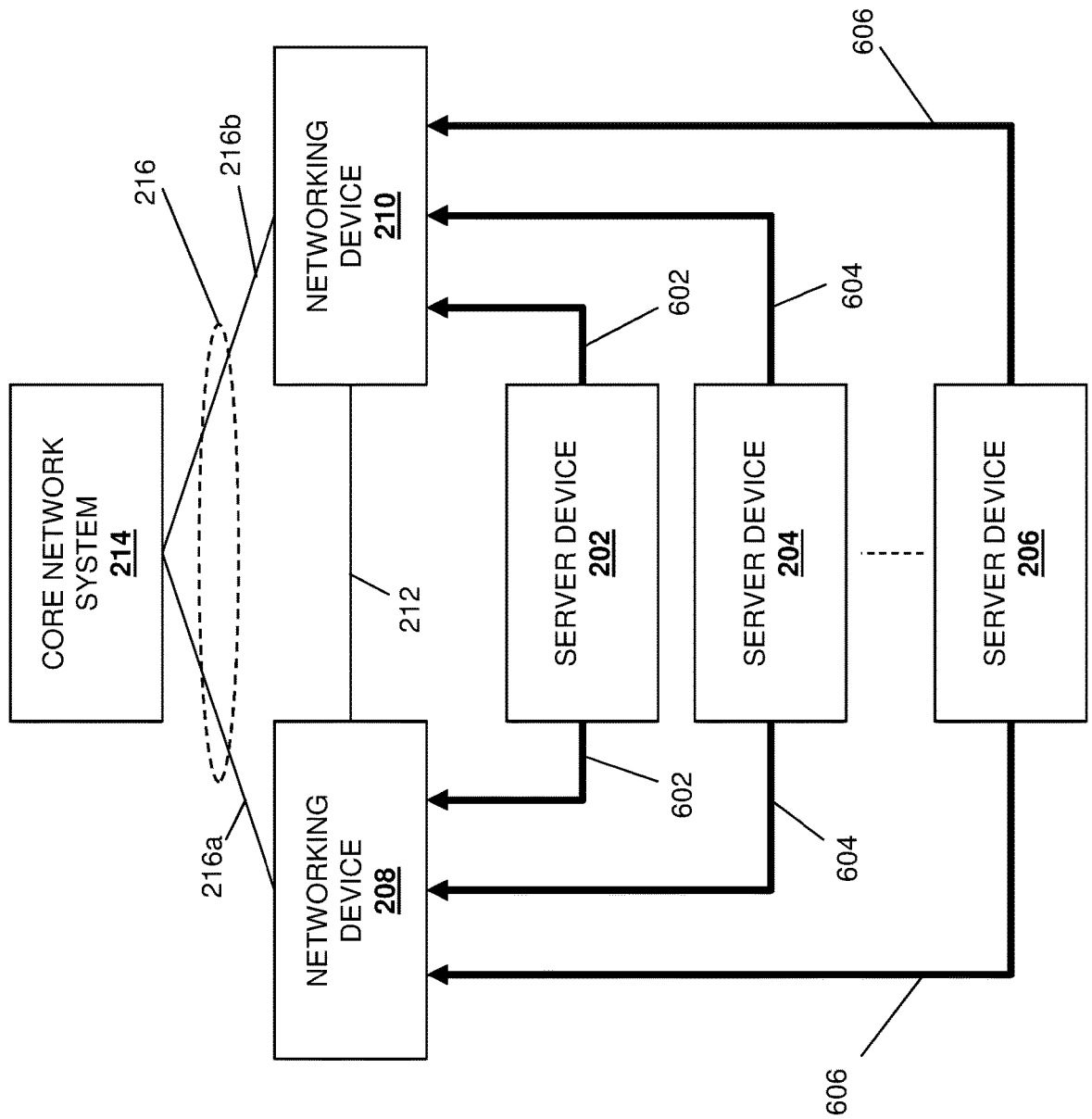
FIG. 6B is a schematic view illustrating an embodiment of the server-facing port activation system of FIG. 2 operating during the method of FIG. 5.

In another example, the server devices 202-206 may communicate with the networking device 300 to which they are connected in order to identify themselves to that networking device 300 as server devices coupled to the downlink ports on that networking device 300. For example, FIG. 6B illustrates how the server engine 404 in the server devices 202-206/400 may be configured to generate server device communications and transmit those server device communications via their uplink ports 408*a*-408*c* that are connected to the networking devices 208 and/or 210 in order to identify themselves to those networking devices as server devices coupled to the downlink ports on those networking devices. As such, FIG. 6B illustrates the server device 202 generating and transmitting server device communications 602 to each of the networking devices 208 and 210, the server device 204 generating and transmitting server device communications 604 to each of the networking devices 208 and 210, and the server device 206 generating and transmitting server device communications 606 to each of the networking devices 208 and 210. In a specific example, the server device communications 602, 604, and 606 may be provided by Link Layer Discovery Protocol (LLDP) communications that include Type-Length-Value (TLV) data structures that are configured to identify that the device transmitting those LLDP communications including those TLV data structures is a server device, although one of skill in the art in possession of the present disclosure will appreciate that other server device communications that communicate similar information will fall within the scope of the present disclosure as well.

As such, the fabric manager sub-engine 304*a* in the networking devices 208/300 and/or 210/300 may receive the server device communications transmitted by their connected server devices via corresponding downlink ports 308*a*-308*c* and, in response, may use those server device communications to identify server devices that are connected to their corresponding downlink ports 308*a*-308*c*. For example, in response to identifying the server devices that are connected to its downlink ports 308*a*-308*c*, the fabric manager sub-engine 304*a* in the networking devices 208/300 and/or 210/300 may generate downlink port/server device association information that identifies server devices (e.g., the server devices 202-206) that are connected to at least some of the downlink ports 308*a*-308*c* on the networking devices 208/300 and/or 210/300, and may store that downlink port/server device association information in the networking database(s) 306. Thus, in the examples provided below, the server devices 202-206 may generate and transmit server device communications that identify that the server device 206*a* is connected to the downlink port 308*a* on each of the networking devices 208/300 and 210/300, and that the server device 206*b* is connected to the downlink port 308*c* on each of the networking devices 208/300 and 210/300, and those server device communications may be utilized to generate and store corresponding downlink port/server device association information in the networking database(s) 306. However, while a few examples of the determination and storage of downlink port/server device association information have been provided, one of skill in the art in possession of the present disclosure will appreciate that information that identifies server devices connected to downlink ports on a networking device may be determined in a variety of manners that will fall within the scope of the present disclosure as well.

In some examples, either or both of the fabric manager sub-engines 304*b* in the networking devices 208/300 and/or 210/300 may perform the inter-networking device operations 600 discussed above with reference to FIG. 6A in order to share its server device communications and/or generated downlink port/server device association information that identifies server devices (e.g., the server devices 202-206) that are connected to at least some of its downlink ports 308*a*-308*c* with the other fabric manager sub-engine 304*b* so that other fabric manager sub-engine 304*b* may store that downlink port/server device association information in its networking database 306, thus providing redundant copies of the downlink port/server device association information on each of the networking devices 208 and 210. In other examples, the fabric manager sub-engine 304*b* operating as the backup fabric manager (e.g., the fabric manager sub-engine 304*b* in the networking device 210/300 as discussed in the example provided above) may perform the inter-networking device operations 600 discussed above with reference to FIG. 6A in order to share its server device communications and/or downlink port/server device association information that identifies server devices (e.g., the server devices 202-206) that are connected to at least some of the downlink ports 308*a*-308*c* on the networking device 210/300 with the fabric manager sub-engine 304*b* operating as the master fabric manager (e.g., the fabric manager sub-engine 304*b* in the networking device 208/300 as discussed in the example provided above), and the fabric manager sub-engine 304*b* operating as the master fabric manager may store that downlink port/server device association information in its networking database 306 (e.g., along with the downlink port/server device association information for the downlink ports 308*a*-308*c* in the networking device 208/300 that includes that fabric manager sub-engine 304*b* operating as a master fabric manager).

In some embodiments of block 502 of the method 500, the networking devices 208/300 and/or 210/300 may be reset, rebooted, and/or otherwise initialized and, in response, the networking sub-engine 304*a* in the networking devices 208/300 and/or 210/300 may operate to identify its downlink ports 308*a*-308*c* that are coupled to server devices 202-206 by, for example, accessing downlink port/server device association information in its networking database 306 and identifying which of those downlink ports 308*a*-308*c* that are associated with a connected server device. As discussed above, the downlink port/server device association information may be provided by a network administrator or other user and stored in the networking database 306, or may be "reported" by those connected server devices (e.g., utilizing the LLDP TLV data structures discussed above) and stored in the networking database 306, and in some embodiments the storing of that downlink port/server device association information may occur prior to the initialization of the networking devices 208/300 and/or 210/300 that results in the performance of block 502. As such, the networking database 306 may be provided in a persistent storage in the networking devices 208/300 and/or 210/300, and the downlink port/server device association information may be stored in that networking database 306 following a first initialization of those networking devices 208/300 and/or 210/300, while a second initialization of the networking devices 208/300 and/or 210/300 that follows the first initialization may result in the performance of block 502 of the method 500.

However, in other embodiments, the networking devices 208/300 and/or 210/300 may receive server device communications and/or determine the downlink port/server device association information to identify the server devices that are connected to its downlink ports 308a-308c following the same initialization (i.e., the networking device 300 may be initialized, may receive the downlink port/server device association information from a network administrator or other user, and may use that downlink port/server device association information to identify server devices connected to its downlink ports 308a-308c; or the networking device 300 may be initialized, may receive the server device communications discussed above from its connected server devices, and may use server device communications to determine downlink port/server device association information that identifies server devices connected to its downlink ports 308a-308c).

Furthermore, in some examples, the fabric manager sub-engine operating as the master fabric manager may identify downlink ports 308a-308c coupled to server devices 202-206 on both networking devices 208 and 210 at block 502. For example, the fabric manager sub-engine 304b on the networking device 208/300 (which may have been elected as the master fabric manager as discussed above) may operate at block 502 (e.g., via performance of the inter-networking device operations 600 discussed above with reference to FIG. 6A) to use the server device communications and/or downlink port/server device association information associated with both networking device 208 and 210 in order to identify any of the downlink ports 308a-308c on both of the networking devices 208/300 and 210/300 that are coupled to server devices 202-206. Thus, one of skill in the art in possession of the present disclosure will appreciate that the identification of server devices connected to downlink ports in one or more networking devices may be performed in a variety of manner that will fall with the scope of the present disclosure as well.

Figure 6C:
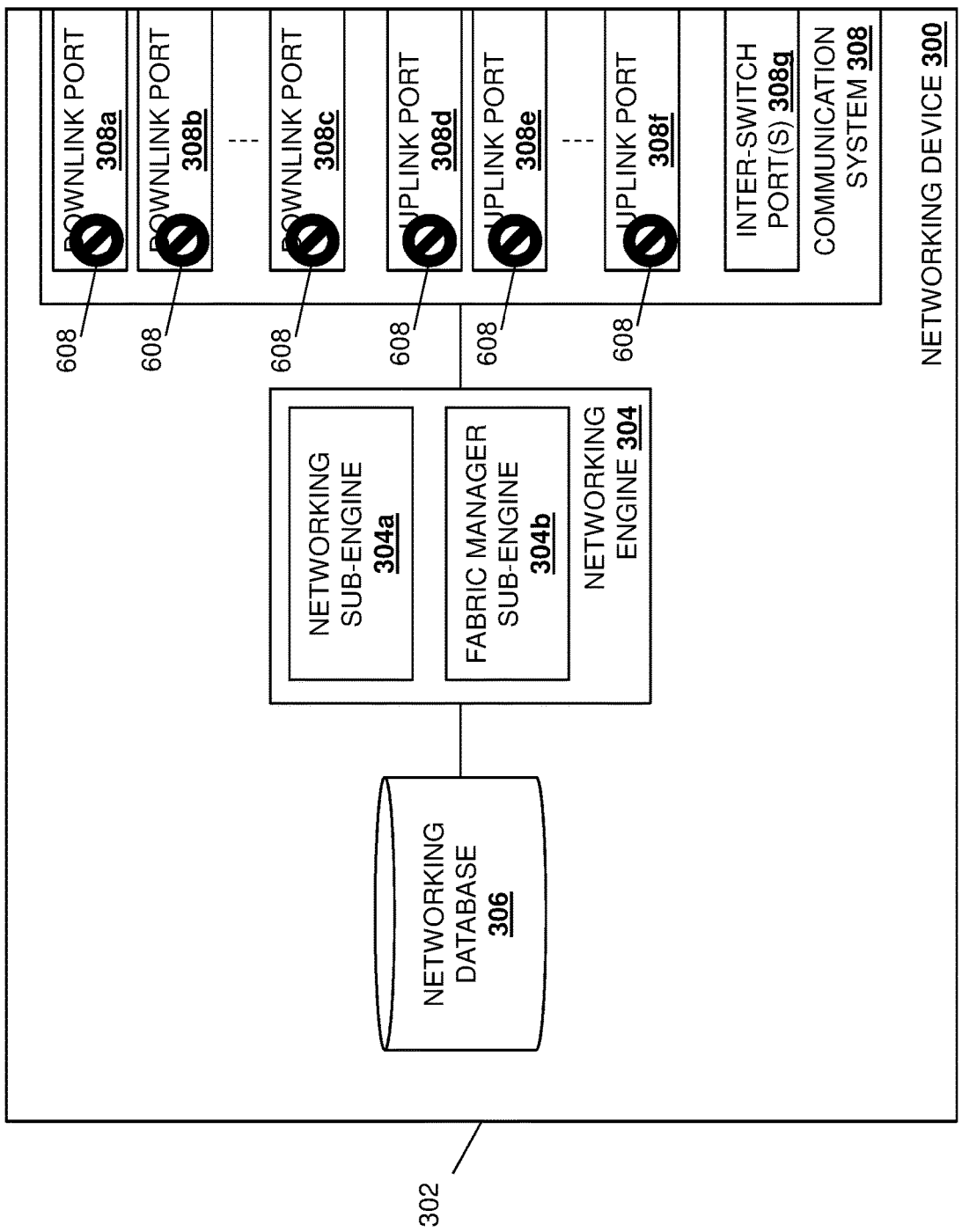
FIG. 6C is a schematic view illustrating an embodiment of the networking device of FIG. 3 operating during the method of FIG. 5.

The method 500 then proceeds to block 504 where the networking device prevents the downlink port(s) that are coupled to the server device(s) from being made available. In an embodiment, at block 504, the networking sub-engine 304a in the networking devices 208/300 and/or 210/300 may operate to prevent downlink ports 308a-308c that were identified as being connected to server devices from being made available. For example, with reference to FIG. 6C, immediately following the initialization of the networking devices 208/300 and/or 210/300, each of the downlink ports 308a-308c and uplink ports 308d-308f on those networking devices 208/300 and 210/300 may be unavailable for use by any connected devices (as indicated by elements 608 in FIG. 6B). As will be appreciated one of skill in the art in possession of the present disclosure, following the initialization of a networking device, that networking device may operate to perform configuration operations on that networking device and/or its downlink ports and uplink ports, and logic in conventional networking devices may be configured to prevent its downlink ports and uplink ports (e.g., the corresponding port hardware that provides those ports) from being made available or "coming up" from the point of view of the devices connected to those downlink ports and uplink ports until those configuration operations have been completed.

As such, as discussed below with reference to block 506, the fabric manager sub-engine 304b in the networking devices 208/300 and/or 210/300 may be configured to perform configuration operations on that networking device 300 and/or its downlink ports 308a-308c and uplink ports 308d-308f. For example, at block 504, the fabric manager sub-engine 304b in the networking devices 208/300 and/or 210/300 may access server device information in the networking database 306 and utilize that server device information in configuration operations on the networking devices 208/300 and/or 210/300 and/or their downlink ports 308a-308c and uplink ports 308d-308f. In a specific example, a network administrator or other user may provide Virtual Local Area Network (VLAN) information for VLANs that the server devices 202-206 are configured to utilize to communicate, as well as any other server device information that one of skill in the art in possession of the present disclosure would recognize as providing for the configuration of server device communications on a networking device, in the networking database 306 for use by the fabric manager sub-engine 304b in the networking devices 208/300 and/or 210/300 in configuring the networking devices 208/300 and/or 210/300 and/or their downlink ports 308a-308c and uplink ports 308d-308f.

Furthermore, at block 504, the networking sub-engine 304a in the networking devices 208/300 and/or 210/300 may operate to prevent any of the downlink ports 308a-308c that were identified as connected to a server device from being made available or "coming up" from the point of view of the devices connected to those downlink ports 308a-308c and uplink ports 308d-308f, even in the event that the configuration operations discussed above have been completed. As such, in one example, the fabric manager sub-engine 304b in the networking devices 208/300 and/or 210/300 may operate to complete configuration operations on that networking device and/or its downlink ports 308a-308c, and the networking sub-engine 304a in those networking devices 208/300 and/or 210/300 may operate to prevent any of the downlink ports 308a-308c that were identified as connected to a server device from being made available or "coming up" from the point of view of the devices connected to those downlink ports 308a-308c and uplink ports 308d-308f (e.g., despite the fact that the networking device 300 and those downlink ports 308a-308c may be configured and ready for use to transmit data communications received from their connected devices).

Figure 6D:
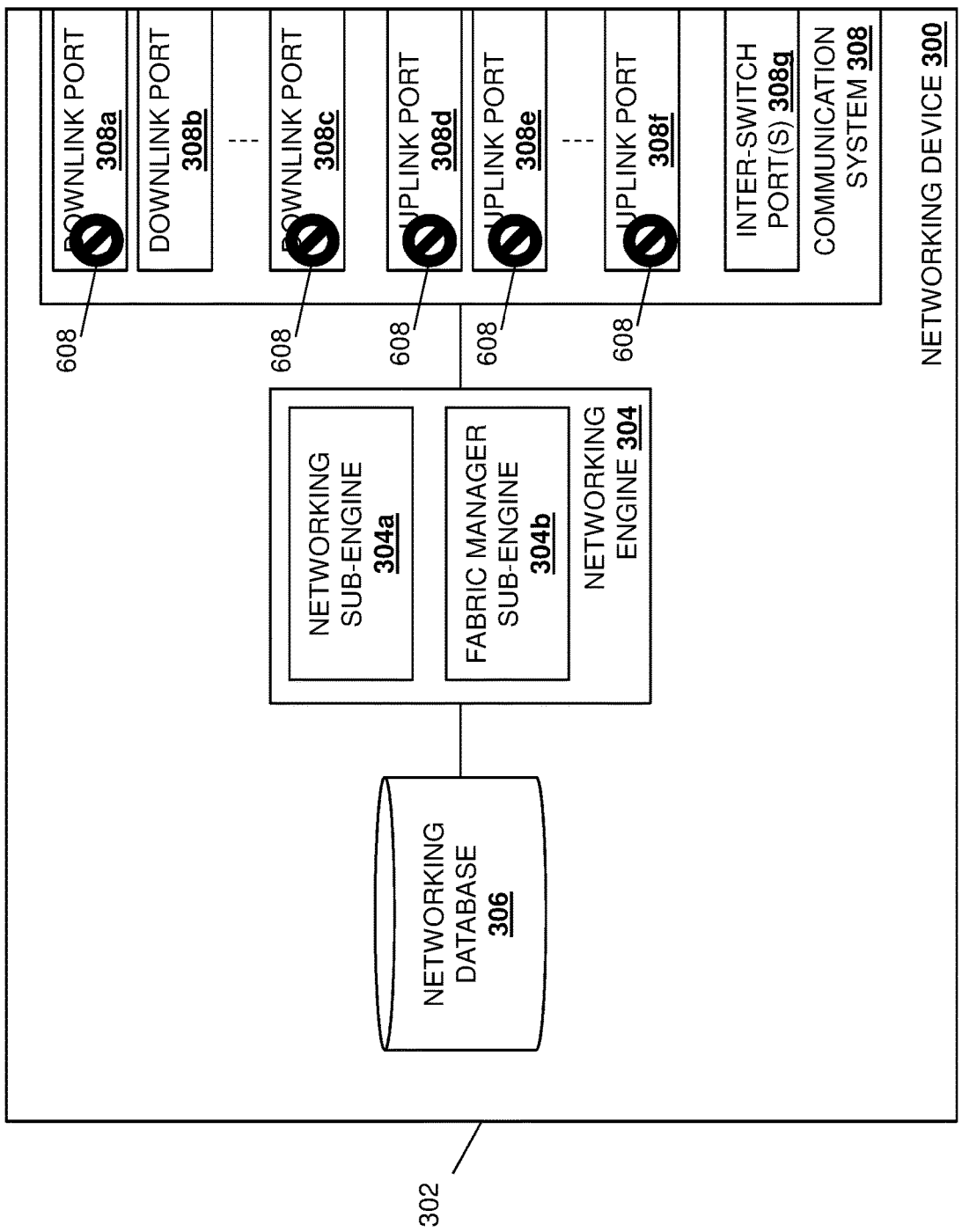
FIG. 6D is a schematic view illustrating an embodiment of the networking device of FIG. 3 operating during the method of FIG. 5.

Furthermore, in some embodiments of block 504, the networking sub-engine 304a in the networking devices 208/300 and/or 210/300 may operate to allow any of the downlink ports 308a-308c that were not identified as being connected to a server device to be made available or "come up" from the point of view of the devices connected to those downlink ports 308a-308c. For example, FIG. 6D illustrates an embodiment in which the downlink port 308b is connected to a non-server device and thus was not identified as being connected to a server device at block 502, and at block 504 the networking sub-engine 304a in the networking device 300 has operated to allow the downlink port 308b that was not identified as being connected to a server device to be made available or "come up" from the point of view of the device connected to that downlink port 308b (as indicated by the lack of an element 608 on the downlink port 308b) following the completion of the configuration of that networking device 300 and/or that downlink port 308b such that it is ready for use to transmit data communications received from the connected device.

Furthermore, in some examples, the fabric manager sub-engine operating as the master fabric manager may operate to prevent downlink ports 308a-308c coupled to server devices 202-206 on both networking devices 208 and 210 from being made available at block 504. For example, the fabric manager sub-engine 304b on the networking device 208/300 (which may have been elected as the master fabric manager as discussed above) may operate at block 504 (e.g., via performance of the inter-networking device operations 600 discussed above with reference to FIG. 6A) to cause the networking sub-engine 304a in the networking device 210/300 to prevent any of the downlink ports 308a-308c on the networking device 210/300 that are coupled to server devices 202-206 from being made available. Thus, one of skill in the art in possession of the present disclosure will appreciate that the preventing of downlink port availability may be performed in a variety of manner that will fall with the scope of the present disclosure as well.

The method 500 then proceeds to block 506 where the networking device configures uplink port(s) coupled to a core network system with server device information associated with the server device(s). As discussed above, at block 506, the fabric manager sub-engine 304b in the networking devices 208/300 and/or 210/300 may operate to configure those networking devices 208/300 and/or 210/300 and/or their uplink ports 308d-308f with server device information associated with the server devices 202-206 connected to those networking devices 208/300 and/or 210/300, which may include accessing server device information in the networking database 306 and utilizing that server device information in configuration operations on the networking devices 208/300 and/or 210/300 and/or their uplink ports 308d-308f. Using the specific example provided above, the fabric manager sub-engine 304b in the networking devices 208/300 and/or 210/300 may utilize the VLAN information provided by a network administrator or other user in the networking database 306, as well as any other server device information that one of skill in the art in possession of the present disclosure would recognize as providing for the configuration of server device communications on a networking device, for use in configuring the networking devices 208/300 and/or 210/300 and/or their uplink ports 308d-308f.

Furthermore, in some examples, the fabric manager sub-engine operating as the master fabric manager may operate to configure the uplink ports 308d-308f on both networking devices 208 and 210 at block 506. For example, the fabric manager sub-engine 304b on the networking device 208/300 (which may have been elected as the master fabric manager as discussed above) may operate at block 506 (e.g., via performance of the inter-networking device operations 600 discussed above with reference to FIG. 6A) to configure the uplink ports 308d-308f on the networking device 210/300 (as well as configuring the uplink ports 308d-308f on the networking device 208/300). Thus, one of skill in the art in possession of the present disclosure will appreciate that the configuration of uplink ports may be performed in a variety of manners that will fall with the scope of the present disclosure as well.

The method 500 then proceeds to decision block 508 where it is determined whether the uplink port(s) are available. In an embodiment, at decision block 506, the fabric manager sub-engine 304b in the networking devices 208/300 and/or 210/300 may operate to monitor the configuration operations performed at block 506 on the uplink ports 308d-308f on those networking devices 208/300 and/or 210/300 in order to determine whether those uplink ports 308d-308f are available. Similarly as discussed above, the networking sub-engine 308a may include logic that is configured to allow its uplink ports (e.g., corresponding port hardware that provides those uplink ports) to be made available or "come up" from the point of view of the devices connected to those uplink ports once configuration operations have been completed, and thus one of skill in the art in possession of the present disclosure will appreciate that the fabric manager sub-engine 304b in the networking devices 208/300 and/or 210/300 may utilize a variety of techniques to determine whether the uplink ports 308d-308f have been made available or have otherwise "come up" while remaining within the scope of the present disclosure.

Furthermore, in some examples, the fabric manager sub-engine operating as the master fabric manager may operate to determine whether the uplink ports 308d-308f on both networking devices 208 and 210 have become available at decision block 508. For example, the fabric manager sub-engine 304b on the networking device 208/300 (which may have been elected as the master fabric manager as discussed above) may operate at decision block 508 (e.g., via performance of the inter-networking device operations 600 discussed above with reference to FIG. 6A) to determine whether the uplink ports 308d-308f on both of the networking devices 208/300 and 210/300 have become available. Thus, one of skill in the art in possession of the present disclosure will appreciate that the determination of the availability of uplink ports may be performed in a variety of manner that will fall with the scope of the present disclosure as well.

Figure 6E:
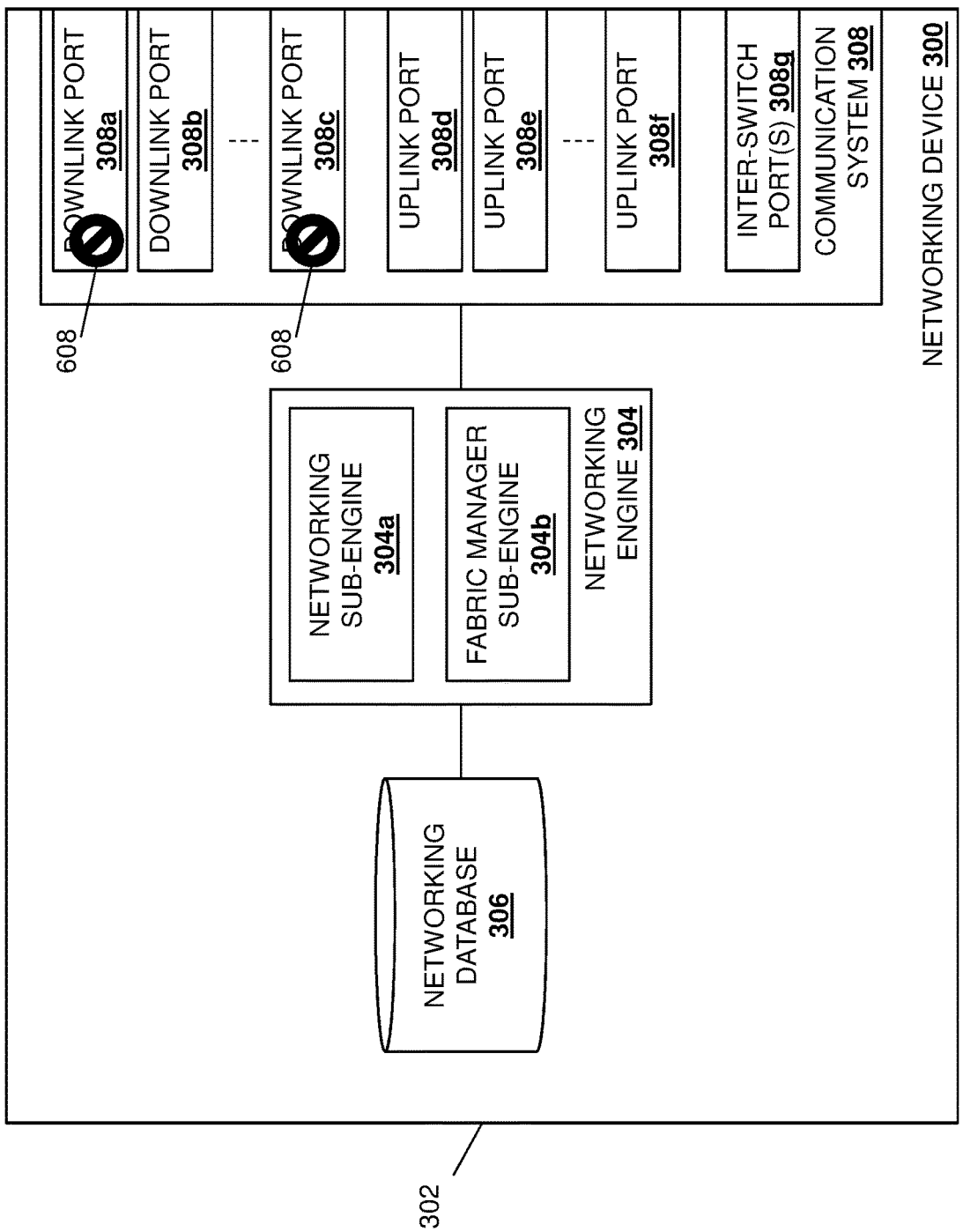
FIG. 6E is a schematic view illustrating an embodiment of the networking device of FIG. 3 operating during the method of FIG. 5.

If, at decision block 508, it is determined that the uplink port(s) are not available, the method 500 returns to block 506. As such, the method 600 may loop such that the fabric manager sub-engine 308a in the networking devices 208/300 and/or 210/300 operate to configure the networking devices 208/300 and/or 210/300 and/or their uplink ports 308d-308f with the server device information until those uplink ports have become available. If at decision block 508, it is determined that the uplink port(s) are available, the method 500 proceeds to block 510 where the networking device causes the downlink port(s) coupled to server device (s) to be made available. As illustrated in FIG. 6E, in an embodiment of decision block 508, the uplink ports 308d-308f may become available (e.g., as indicated by the lack of elements 608 in FIG. 6E) to forward data communications (and with all resources (e.g., VLANs) needed to forward data communications configured in the networking device 300) and, in response, the fabric manager sub-engine 304b may determine that those uplink ports 308d-308f are available. In an embodiment, at block 510 and in response to determining that the uplink ports 308d-308f on the networking devices 208/300 and/or 210/300 have become available, the fabric manager sub-engine 304b in the networking devices 208/300 and/or 210/300 may cause the networking sub-engine 308a in those networking devices 208/300 and/or 210/300 to make the downlink ports 308a and 308c that are connected to server devices and that were prevented from being made available at block 504 to be made available.

Figure 6F:
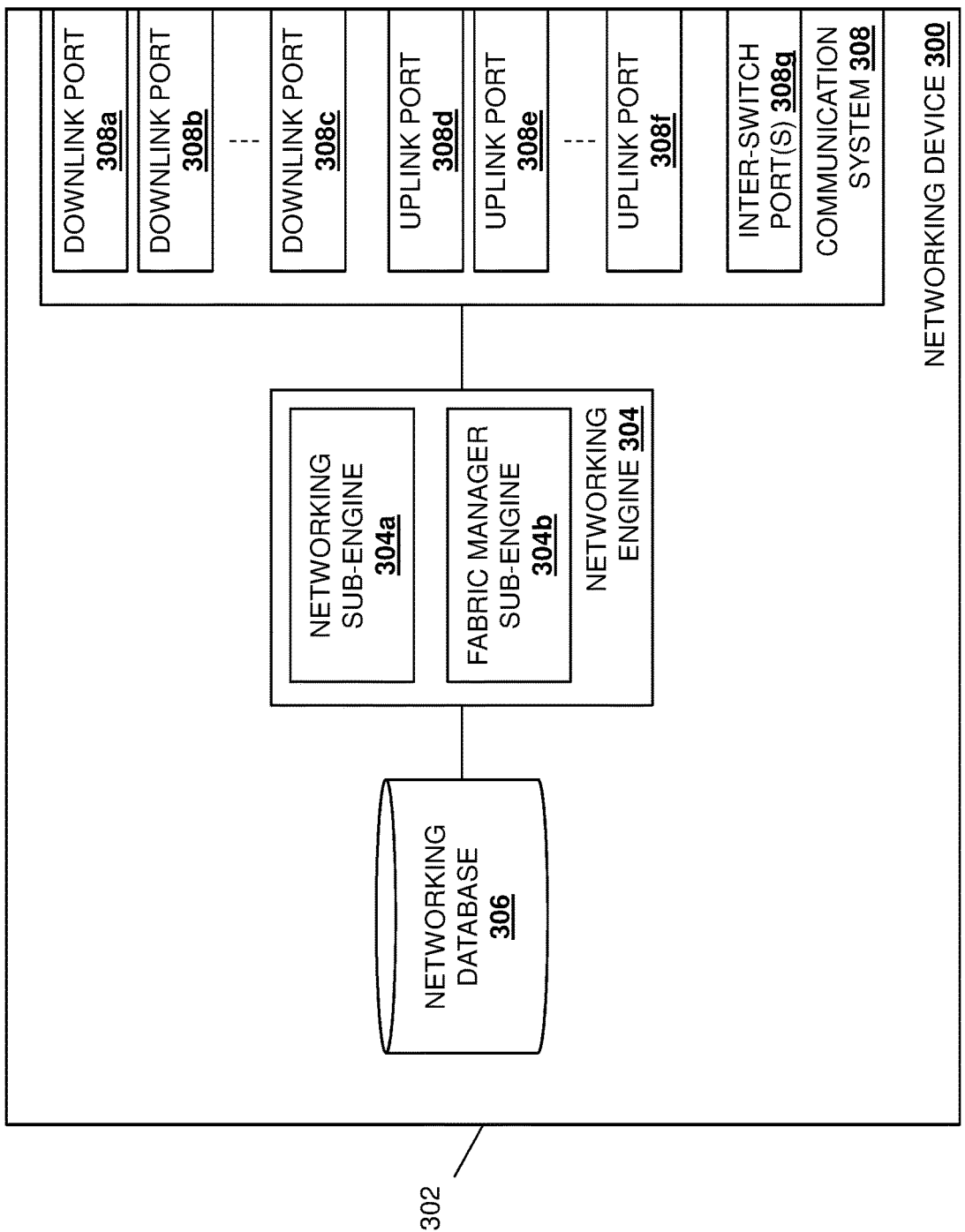
FIG. 6F is a schematic view illustrating an embodiment of the networking device of FIG. 3 operating during the method of FIG. 5.

For example, at block 510, the fabric manager sub-engine 304b in the networking devices 208/300 and/or 210/300 may cause the logic in the networking sub-engine 308a to allow the downlink ports 308a and 308c (e.g., corresponding port hardware that provides those ports) to be made available or "come up" from the point of view of the devices connected to those downlink ports 308a and 308c once the uplink ports 308d-308f have become available. As illustrated in FIG. 6F, in an embodiment of block 510, the downlink ports 308a and 308c have been made available (e.g., as indicated by the lack of elements 608 in FIG. 6E), and one of skill in the art in possession of the present disclosure will appreciate how the server devices 202-206/400 connected to those downlink ports 308a and 308c may detect the availability of those downlink ports 308a and 308c and, in response, generate and transmit data communications via its uplink ports 408a-408c connected to those downlink ports 308a and 308c, with the networking engine 304a receiving those data communications via the downlink ports 308a and 308c and transmitting those data communication through its available uplink ports 308d-308f.

Furthermore, in some examples, the fabric manager sub-engine operating as the master fabric manager may operate to cause the downlink ports 308a and 308c on both networking devices 208/300 and 210/300 to be made available at block 510. For example, the fabric manager sub-engine 304b on the networking device 208/300 (which may have been elected as the master fabric manager as discussed above) may operate at block 510 (e.g., via performance of the inter-networking device operations 600 discussed above with reference to FIG. 6A) to cause downlink ports 308a and 308c on the networking device 210/300 to be made available (e.g., in addition to causing the downlink ports 308a and 308c on the networking device 208/300 to be made available) in a manner similar to that described above. Thus, one of skill in the art in possession of the present disclosure will appreciate that causing downlink ports to become available may be performed in a variety of manner that will fall with the scope of the present disclosure as well.

Figure 7:
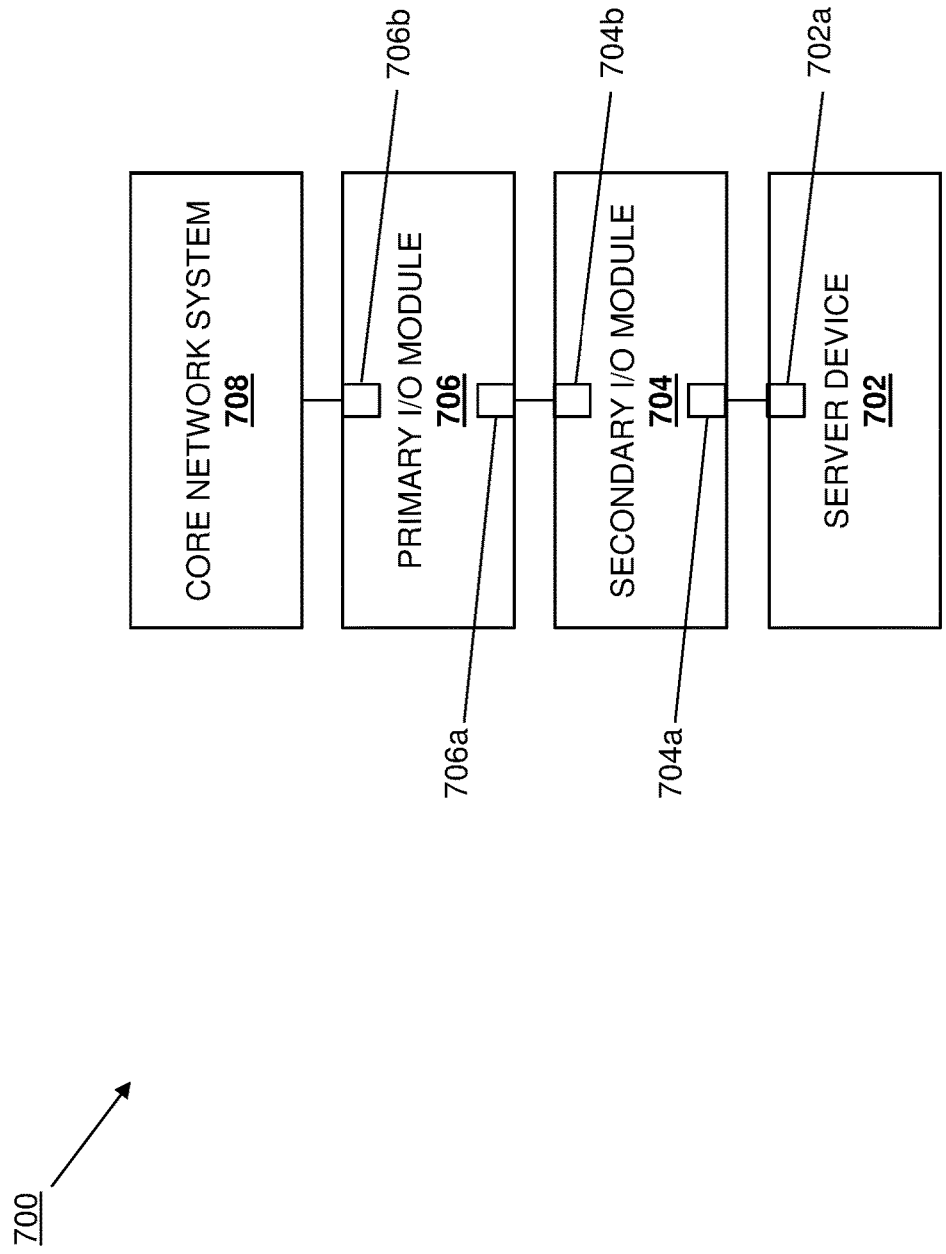
FIG. 7 is a schematic view illustrating another embodiment of a server-facing port activation system.

As discussed above, the teachings of the present disclosure may be utilized in other port activation system configurations as well. For example, with reference to FIG. 7, a server-facing port activation system 700 may include a server device 702, a secondary Input/Output (I/O) module 704 including downlink port(s) 704a that are coupled to uplink port(s) 702a on the server device 702, a primary Input/Output (I/O) module 706 including downlink port(s) 706a that are coupled to uplink port(s) 704b on the secondary I/O module 704, and a core network system 708 including downlink port(s) 708a that are coupled to uplink port(s) 706b on the primary I/O module 706.

In a specific example, the primary I/O module 706 may be provided by DELL® EMC® networking MX9116n fabric switching engine switch device, available from DELL® Inc. of Round Rock, Tex., United States. One of skill in the art in possession of the present disclosure will appreciate that the primary I/O module 706 may be provided by a "full-function" I/O module that include an operating system and that may be configured to perform any of a variety of I/O module functions known in the art in handling server device communications, and in specific examples may include networking hardware providing networking functions capable of supporting the secondary I/O modules discussed below that are coupled to them via double-density connections. Furthermore, the secondary I/O module 704 may be provided by a DELL® MX7108 expander module, available from DELL® Inc. of Round Rock, Tex., United States. One of skill in the art in possession of the present disclosure will appreciate that the secondary I/O module 704 may be provided to enable its connected primary I/O module to couple to additional server devices (discussed in further detail below) and, as such, may not include an operating system, and may not be configured to perform many (or all of) the variety of I/O module functions performed by the primary I/O module 706, and in specific examples may and electrical pass-through device connected via double-density connections to the primary I/O modules discussed above.

One of skill in the art in possession of the present disclosure will recognize how the primary I/O module 706 may prevent its downlink port(s) 706a that are coupled to the server device 702 via the secondary I/O module 704 from being made available until its uplink port(s) 706a that are connected to the core network system 708 are available in a manner that is similar to that discussed above with regard to the method 500. As such, the teachings of the present disclosure may extend to the activation of ports in a variety of systems while remaining within the scope of the present disclosure as well.

Thus, systems and methods have been described that operate to make downlink ports on a switch device unavailable until uplink ports on the switch device that are connected to a core network have been configured for use. For example, the switch device includes uplink port(s) that are coupled to the core network, and downlink port(s) that are coupled to device(s), and in response to beginning initialization operations, the switch device identifies the downlink port(s) coupled to device(s) and prevents those downlink port(s) from being made available. While preventing the downlink port(s) coupled to the device(s) from being made available, the switch device configures the uplink port(s) coupled to the core network system with device information associated with the device(s) connected to the downlink port(s). When the switch device determines that the uplink port(s) coupled to the core network system are available, it causes the downlink port(s) coupled to the device(s) to be made available. As such, downlink port(s) are not made available for use by the device(s) until the uplink port(s) are available, thus preventing the switch device from "dropping" or otherwise discarding data traffic that would otherwise be generated and transmitted by the device(s) if the downlink port(s) were made available prior to the availability of the uplink port(s), as occurs in conventional port activation systems Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A server-facing port activation system, comprising:
   a core network system;
   a server device; and
   a networking device that includes at least one uplink port that is coupled to the core network system, and a first downlink port that is coupled to the server device, wherein the networking device is configured to begin initialization operations and, in response:
   identify that the first downlink port is coupled to the server device;
   prevent the first downlink port that is coupled to the server device from being made available;
   configure, while preventing the first downlink port that is coupled to the server device from being made available, the at least one uplink port that is coupled to the core network system with server device information associated with the server device;
   determine that the at least one uplink port that is coupled to the core network system is available; and
   cause, in response to determining that the at least one uplink port that is coupled to the core network system is available, the first downlink port that is coupled to the server device to be made available.

2. The system of claim 1, wherein the server device information associated with the server device includes Virtual Local Area Network (VLAN) information associated with a VLAN that the server device is configured to utilize in data communications.

3. The system of claim 1, wherein the identifying that the first downlink port is coupled to the server device includes:
accessing a networking database that identifies downlink ports on the networking device that are coupled to server devices.

4. The system of claim 3, wherein the networking device is configured to:
receive, from the server device, a server device communication that identifies that the server device is coupled to the first downlink port; and
store the identification that the server device is coupled to the first downlink port in the networking database.

5. The system of claim 3, wherein the networking device is configured to:
receive, from a user, an identification that the server device is coupled to the first downlink port; and
store the identification that the server device is coupled to the first downlink port in the networking database.

6. The system of claim 1, wherein the networking device includes a second downlink port that is coupled to a non-server device, and wherein the networking device is configured to:
identify that the second downlink port is coupled to the non-server device; and
cause the second downlink port that is coupled to the non-server device to be made available.

7. An Information Handling System (IHS), comprising:
a processing system; and
a memory system that is coupled to the processing system and that includes instructions that, when executed by the processing system, cause the processing system to provide a server-facing port activation engine that is configured to begin initialization operations and, in response:
identify that a first downlink port is coupled to a server device;
prevent the first downlink port that is coupled to the server device from being made available;
configure, while preventing the first downlink port that is coupled to the server device from being made available, at least one uplink port that is coupled to a core network system with server device information associated with the server device;
determine that the at least one uplink port that is coupled to the core network system is available; and
cause, in response to determining that the at least one uplink port that is coupled to the core network system is available, the first downlink port that is coupled to the server device to be made available.

8. The IHS of claim 7, wherein the server device information associated with the server device includes Virtual Local Area Network (VLAN) information associated with a VLAN that the server device is configured to utilize in data communications.

9. The IHS of claim 7, wherein the identifying that the first downlink port is coupled to the server device includes:
accessing a database that identifies downlink ports that are coupled to server devices.

10. The IHS of claim 9, wherein the server-facing port activation engine is configured to:
receive, from the server device, a server device communication that identifies that the server device is coupled to the first downlink port; and
store the identification that the server device is coupled to the first downlink port in the database.

11. The IHS of claim 10, wherein the server device communication is a Link Layer Discovery Protocol (LLDP) communication.

12. The IHS of claim 7, wherein the server-facing port activation engine is configured to:
receive, from a user, an identification that the server device is coupled to the first downlink port; and
store the identification that the server device is coupled to the first downlink port in the database.

13. The IHS of claim 7, wherein the server-facing port activation engine is configured to:
identify that a second downlink port is coupled to a non-server device; and
cause the second downlink port that is coupled to the non-server device to be made available.

14. A method for activating server facing ports, comprising:
identifying, by a networking device, that a first downlink port is coupled to a server device;
preventing, by the networking device, the first downlink port that is coupled to the server device from being made available;
configuring, by the networking device while preventing the first downlink port that is coupled to the server device from being made available, at least one uplink port that is coupled to a core network system with server device information associated with the server device;
determining, by the networking device, that the at least one uplink port that is coupled to the core network system is available; and
causing, by the networking device in response to determining that the at least one uplink port that is coupled to the core network system is available, the first downlink port that is coupled to the server device to be made available.

15. The method of claim 14, wherein the server device information associated with the server device includes Virtual Local Area Network (VLAN) information associated with a VLAN that the server device is configured to utilize in data communications.

16. The method of claim 14, wherein the identifying that the first downlink port is coupled to the server device includes:
accessing, by the networking device, a networking database that identifies downlink ports that are coupled to server devices.

17. The method of claim 16, further comprising:
receiving, by the networking device from the server device, a server device communication that identifies that the server device is coupled to the first downlink port; and
storing, by the networking device, the identification that the server device is coupled to the first downlink port in the networking database.

18. The method of claim 17, wherein the server device communication is a Link Layer Discovery Protocol (LLDP) communication.

19. The method of claim 14, further comprising:
receiving, by the networking device from a user, an identification that the server device is coupled to the first downlink port; and storing, by the networking device, the identification that the server device is coupled to the first downlink port in the database.

20. The method of claim 14, further comprising:

identifying, by the networking device, that a second downlink port is coupled to a non-server device; and causing, by the networking device, the second downlink port that is coupled to the non-server device to be made available.

* * * * *